United States Patent [19]

DeCarolis et al.

[11] Patent Number: 5,044,083
[45] Date of Patent: Sep. 3, 1991

[54] TELESCOPING HACKSAW FRAME

[75] Inventors: Joseph P. DeCarolis, Bristol, Conn.; Allen F. Korfmacher, York, Pa.

[73] Assignee: The Stanley Works, New Britain, Conn.

[21] Appl. No.: 621,292

[22] Filed: Nov. 30, 1990

[51] Int. Cl.[5] ............................................. B23D 51/03
[52] U.S. Cl. ..................................................... 30/510
[58] Field of Search .................. 30/507, 510, 511, 517

[56] References Cited

U.S. PATENT DOCUMENTS

| | | |
|---|---|---|
| 487,358 | 12/1892 | Whelpley . |
| 1,473,803 | 11/1923 | Adell et al. . |
| 1,565,861 | 12/1925 | McIntire . |
| 1,569,408 | 1/1926 | Spartivento . |
| 1,610,381 | 12/1926 | Jacobey . |
| 2,014,722 | 9/1935 | Damon . |
| 2,219,136 | 10/1940 | Mills et al. . |
| 2,388,655 | 11/1945 | Lenla ............... 30/311 X |
| 2,580,896 | 1/1952 | Dohner . |
| 2,941,558 | 6/1960 | Dreier ................ 30/510 |
| 3,173,461 | 3/1965 | Johnson ............. 30/510 |

*Primary Examiner*—Douglas D. Watts

[57] ABSTRACT

A hacksaw has an adjustable frame with an elongated rear frame member having an inverted U-shaped cross section and providing a downwardly opening channel. The rear frame rearward end portion is secured in the upper portion of the hand grip and its side walls adjacent the forward end have lower portions which extend inwardly and incline upwardly towards the forward end to provide an upwardly inclined ramp. This ramp substantially closes the channel and terminates in a lip at the forward end of the frame member, and the top wall and side walls adjacent thereto are relieved above the ramp. A front frame member of bar-like configuration having a bridge portion seated in the channel of the rear frame section, and a depending leg portion at its forward end which has a blade mounting element adjacent its lower end. The bridge portion has spaced recesses in its bottom edge in which the lip of the ramp is seated. The frame also has a rear leg member extending below the rear frame section forwardly of the hand grip, and its upper end portion is seated in the upper end of the hand grip. This leg member has blade mounting element adjacent its lower end cooperating with that of the front frame member to secure a blade extending therebetween. The length of the frame is adjustable by pivoting upwardly the front end of the front frame member to disengage the ramp from the recess of the bridge portion, and the bridge portion is slid within the channel of the rear frame member to align a desired recess therein with the ramp.

12 Claims, 2 Drawing Sheets

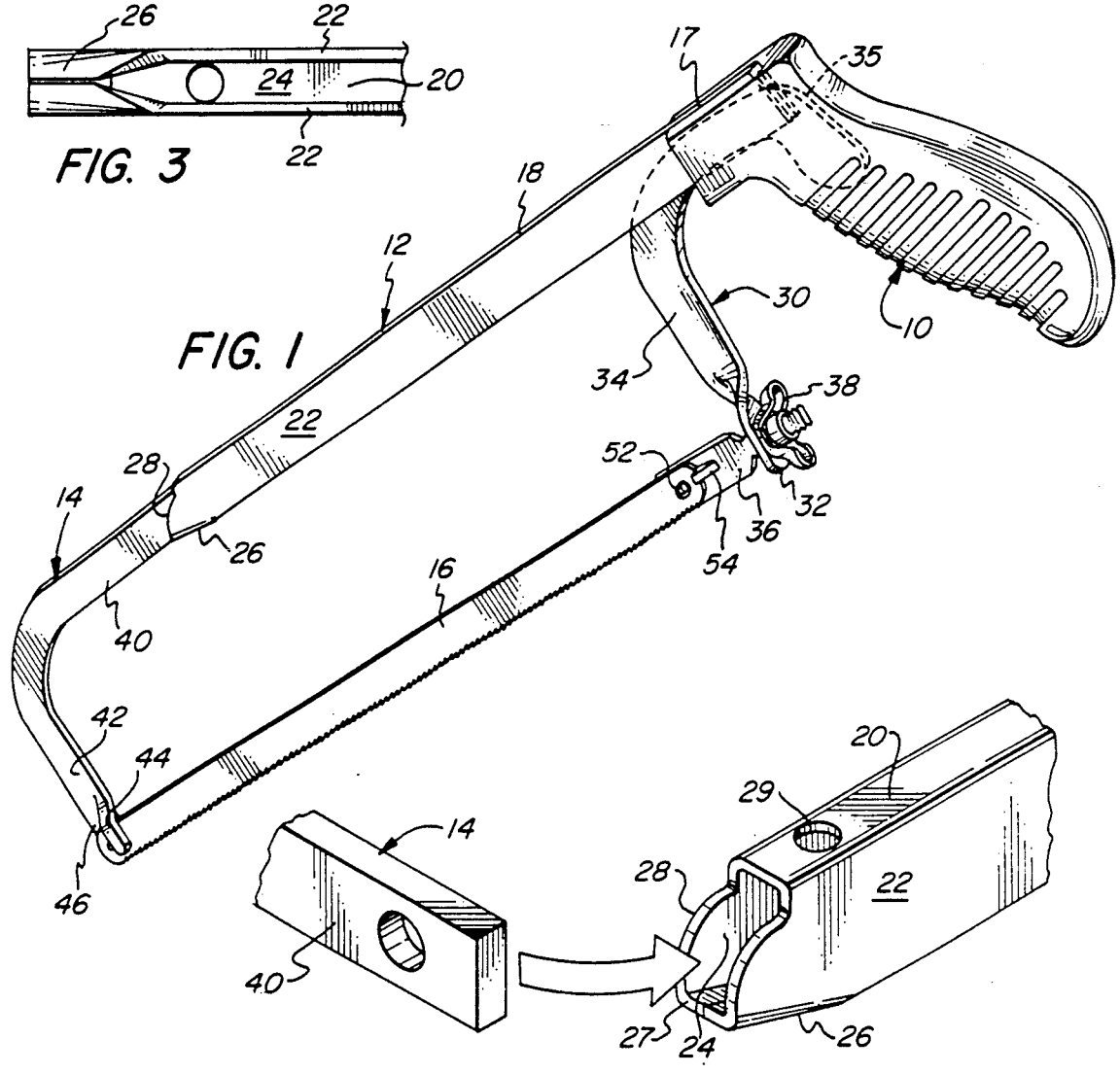

TELESCOPING HACKSAW FRAME

BACKGROUND OF THE INVENTION

The present invention relates to hacksaws and, more particularly, to hacksaws with telescoping frames.

Hacksaws are widely employed for cutting metal and the like, and various blades are made from different metal alloys or provided with special cutting coatings for use therein. Moreover, depending upon the workpiece to be cut, hacksaws with different length blades may be used to provide a longer or shorter cutting stroke. Seven and nine inch blades are fairly standard, and some hacksaws are provided with frames which will permit adjustment in the length of their bridge portion to enable use of blades of multiple sizes.

In most instances, the frames use telescoping elements to provide the adjustment and some provide detents, pins, rivets or other means to provide some stability in the adjusted positions. Some hacksaw frames providing such adjustability with good positioning elements are rather expensive to fabricate, and others provide positioning elements which are not particularly effective or which are relatively short lived. As will be appreciated, slippage of the frame in length from its adjusted position can produce undesired compressive of other forces on the blade. Illustrative of such devices are Whelpley U.S. Pat. No. 487,358, Adell et al U.S. Pat. No. 1,473,803, McIntire U.S. Pat. No. 1,565,861 and Spartivento U.S. Pat. No. 1,569,408. In such telescoping constructions, one of the frame elements generally fits within a channel or cylindrical cavity formed in the other, and there is provided some form of locking on the two elements to maintain the frame in an adjusted position.

For several years, Applicants' assignee, The Stanley Works, has marketed a telescoping hacksaw frame utilizing a rear frame member having an inverted channel shaped configuration in which is received a bar-shaped front frame member. A rivet is provided in the channel shaped rear member and it seats in relatively narrow but deep notches formed in the front frame member. A relatively wide slot is provided in the top wall of the rear member adjacent the rivet in order to permit pivoting of the front element relative to the rear frame member in order to effect relative sliding motion Although this structure has been generally satisfactory, it has presented some problems from the standpoint of relative weakness in the area where maximum stress occurs, i.e., about the engagement between the two elements.

It is an object of the present invention to provide a novel telescoping hacksaw frame which may be fabricated economically and which enables stable positioning of the frame elements in their adjusted position.

It is also an object to provide such a frame which may be adjusted simply and quickly.

Another object is to provide such a frame in which the components may be fabricated from sheet metal or like stock by relatively economical and simple techniques.

SUMMARY OF THE INVENTION

It has now been found that the foregoing and related objects may be readily attained in an adjustable hacksaw which has a hand grip and an elongated rear frame member of inverted U-shaped cross section defined by a top wall and depending side walls providing a downwardly opening channel. This member has its rearward end portion secured in the upper portion of the hand grip, and its side walls adjacent the forward end have their lower portions extending inwardly and inclined upwardly towards the forward end to provide an upwardly inclined ramp substantially closing the channel and terminating in a lip at the forward end of the frame member. The adjacent top wall and side walls are relieved above the ramp.

A front frame member of generally vertically oriented bar-like configuration has an elongated bridge portion with its rearward end portion seated in the channel of the rear frame section. At the forward end of the bridge portion, the front frame section has a depending leg portion with blade mounting means adjacent its lower end. The bridge portion has a multiplicity of spaced elongated recesses in its bottom edge, and the lip of the ramp Is seated in one of the recesses.

A rear leg member extends below the rear frame section forwardly of the hand grip, and has its upper end portion seated in the upper end portion of the hand grip. The leg member has blade mounting means adjacent its lower end which cooperates with that of the front frame member to secure a blade extending therebetween. The length of the frame is adjustable by pivoting upwardly the front end of the front frame member to disengage the ramp from the recess of the bridge portion and then sliding the bridge portion within the channel of the rear frame member to align the desired recess with the lip, after which the bridge portion is pivoted downwardly to effect engagement therewith.

Preferably, the inwardly extending portions of the sidewalls of the rear frame member abut. If so desired to provide greater rigidity, the opposed edges may be secured together, conveniently by welding. The relieved side walls of the rear frame section extend rearwardly and incline upwardly from the front end to the top wall.

The rear leg member is of generally bar-like cross section with its upper end portion extending upwardly and rearwardly into the hand grip, most desirably within the channel of the rear frame member to which it may be welded if so desired. Preferably, the recesses are of inverted U-shaped configuration and have a length approximating that of the ramp to seat the ramp snugly within the recesses.

BRIEF DESCRIPTION OF THE DRAWINGS

FIG. 1 is a perspective view of an adjustable hacksaw embodying the present invention;

FIG. 2 is a fragmentary side elevational view of the disassembled front and rear sections of the frame;

FIG. 3 is a fragmentary bottom view of the forward portion of the rear section of the frame;

FIG. 4 is a fragmentary exploded view of the telescoping portions of the front and rear sections of the frame;

DETAILED DESCRIPTION OF THE ILLUSTRATED EMBODIMENTS

Figure 5:
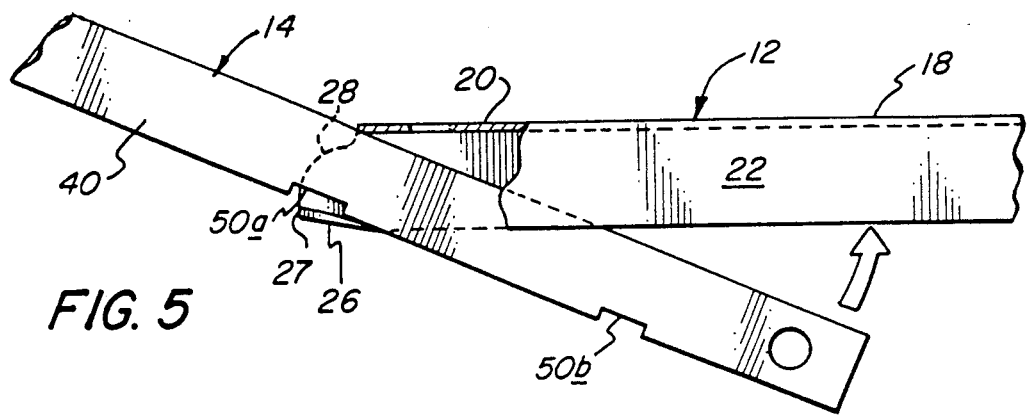
FIG. 5 is a fragmentary side elevational view in partial section of the telescoping sections of the frame showing the front section pivoted upwardly to disengage the front section from the engaging element on the rear section.
Figure 6:
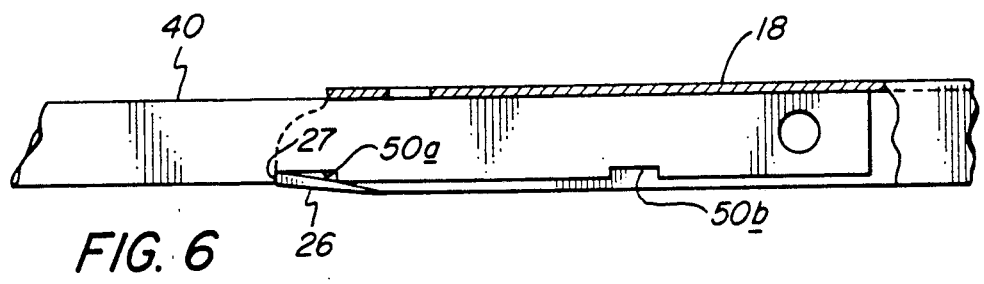
FIG. 6 is a similar view with the front section pivoted downwardly and engaged.
Figure 7:
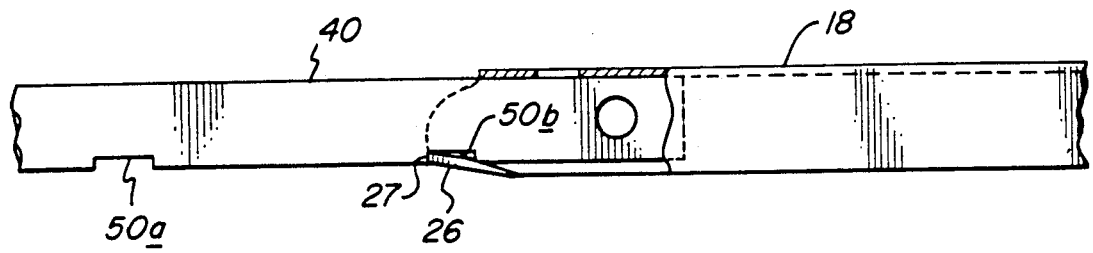
FIG. 7 is a similar view, but with the front section moved forwardly into a second adjusted position.

Turning first to FIG. 1 of the attached drawings, a hacksaw embodying the present invention is comprised of the handle or hand grip generally designated by the numeral 10, a rear frame section generally designated by the numeral 12, a front frame section generally designated by the numeral 14, the hacksaw blade 16, and a rear leg member designated by the numeral 30.

Turning first to the detail of the rear frame section 12, it is of generally inverted U-shaped configuration with a top wall 20 and side walls 22 providing a downwardly opening channel 24 therebetween. The rearward end 17 extends into, and is firmly secured within, the upper portion of the hand grip or handle 10, and the bridge portion 18 extends forwardly therefrom. Adjacent its forward end, the lower portions of the side walls 22 are bent inwardly and inclined upwardly to provide a ramp 26 which terminates in a lip 27. As indicated in FIGS. 3 and 4, the opposed edges of the inwardly bent portions of the ramp 26 abut, and they may be tack welded or otherwise bonded together to provide greater rigidity if so desired. Above the ramp 26, the side walls 22 and the top wall 20 are relieved as indicated by the arcuate cutout 28. Also illustrated In FIGS. 3 and 4 is a small pilot hole 29 which is utilized during the forming operation.

The front frame section 14 is conveniently formed from flat bar stock with a bridge portion 40 which telescopically fits within the channel 24 of the rear frame section 12 and a depending leg portion 42 at its forward end. In the bottom edge of the bridge portion 40 are a pair of spaced elongated U-shaped recesses 50. The leg portion 42 is formed with a slotted offset portion providing a pair of forks 44, 46 between which the saw blade 16 extends, and the forward fork 46 has a horizontally projecting pin 48 which seats within the aperture formed at the forward end of the blade 16.

At the rearward end of the frame, the depending leg 30 is formed from bar stock with a relatively planar body portion 34. The lower end portion 32 is bent so that it lies in a plane perpendicular to the plane of the blade 16, and it seats the tension bolt 36 in an aperture extending therethrough, and the wing nut 38 is engaged thereon. The tension bolt 36 includes a pin portion 52 which fits within an aperture at the rear end of the blade 16 and a positioning lip 54 captures the rear edge portion of the blade 16 as is conventional.

When it is desired to substitute a blade 16 of different length, the wing nut 38 is loosened to relieve the tension upon the blade 16, and the blade 16 is disengaged from the pins 52 and 48. As indicated in FIG. 5 of the drawings, the front end section 14 may now be pivoted upwardly to disengage the lip 27 from the recess 50 in which it is seated. As will be appreciated, the relieved portion 28 allows the front frame section 14 to pivot upwardly to the released position.

With the forward frame section 14 so pivoted, it may now be moved to a position in which the lip 27 is aligned with the desired recess 50, at which time the front frame section 14 is again pivoted downwardly to seat the lip 27 in the recess 50 corresponding to the desired length of blade to be employed.

As will be readily appreciated, the shallow recesses 50 minimize the weakening of the bar stock providing the front frame member, and the abutting and bonded portions of the side walls providing the ramp 26 enhance the strength of the forward frame section which has its walls relieved to permit pivoting of the front section. The ramp surface 26 with its lip 27 seat relatively securely in the elongated recess 50 to provide a fairly stable assembly when the blade is tensioned between the front leg portion 42 and the rear leg 30.

In the illustrated embodiment, it can be seen that the upper portion 35 of the rear leg portion extends into the channel 24 of the rear section 12 and into the handle 10 and then downwardly therefrom. This configuration minimizes the cross section utilized for seating the metallic elements of the frame. At the same time it enables the two metallic members to be spot welded to provide a relatively high strength bond therebetween and then with the resin of the handle.

Although only two recesses have been shown in the illustrated embodiment, additional recesses may be provided for still other length blades and the recesses may be reduced in length to limit further the relative movement permitted in any adjusted length.

In fabricating the frame, the bridge element of the rear section is blanked from sheet metal, and the blanking or a subsequent operation may provide one or more stiffening ribs or corrugations along the length of the portions to form its sidewalls. The blanking step may conveniently provide the cutout for the contoured front edges of the sidewalls and the relieved section of the top wall. The blanked piece is then formed in one or more dies to provide the U-shaped configuration of the channel and the inturned portions at the front end to form the lip. To provide higher strength in the lip, the internal portions are spot or butt welded along their abutting edges The front bridge section and the depending leg of the rear section are blanked from thicker metal stock in their intended contours to provide relatively stiff elements of solid cross section. The forward section has its leg portion slit and deformed to provide the blade gripping elements, and the rear leg is deformed and pierced to provide its blade mounting portion to seat the draw bolt.

The means of engagement of the rear section elements in the handle may vary. From the standpoint of easy and economy of assembly, the handle may be preformed in two halves from synthetic resin with recesses into which the subassembly of the rear frame and rear leg is fitted, and the two halves are then bonded. If so desired, barbs may be provided on the sidewalls of the bridge portion and the downwardly extending portion of the leg to engage the plastic and resist withdrawal from the slot in the handle. One or more locking pins or rivets extending through the sides of the handle and the metal elements may also be used. Alternatively, the handle can be molded about the metal subassembly which is preferred when the handle is fabricated from an elastomer.

Thus, it can be seen from the attached drawings and the foregoing detailed specification, that the hacksaw of the present invention provides a frame which is readily adjustable and which eliminates the need for a separate rivet or fastening element to secure the telescoping sections in adjusted position. The several components may be readily fabricated and assembled to provide a structure which is economical and relatively long-lived.

Having thus described the invention, what is claimed is:

1. In a hacksaw having an adjustable frame, the combination comprising:

(a) a hand grip;

(b) an elongated rear frame member having an inverted U-shaped cross section defined by a top wall and depending side walls and providing a downwardly opening channel, said rear frame member having its rearward end portion secured in the upper portion of said hand grip, said side walls adjacent the forward end thereof having their lower portions extending inwardly and inclined upwardly towards said forward end to provide an upwardly inclined ramp substantially closing the channel and terminating in a lip at the forward end of said frame member, the top wall and side walls adjacent thereto being relieved above said ramp;

(c) a front frame member of generally vertically oriented bar-like configuration having an elongated bridge portion with its rearward end portion seated in said channel of said rear frame section, said front frame section having a depending leg portion at the forward end of said bridge portion and blade mounting means adjacent the lower end of said leg portion, said bridge portion having a multiplicity of spaced recesses in its bottom edge, said lip being seated in one of said recesses; and (d) a rear leg member extending below said rear frame section forwardly of said hand grip, said rear leg member having its upper end portion seated in the upper end of said hand grip, said leg member having blade mounting means adjacent its lower end cooperating with that of said front frame member to secure a blade extending therebetween, the length of said frame being adjustable by pivoting upwardly the front end of said front frame member to disengage said lip from the recesses of said bridge portion and sliding said bridge portion within said channel of said rear frame member to align a desired recess therein with said lip and pivoting the bridge portion downwardly to effect engagement therewith.

2. The hacksaw in accordance with claim 1 wherein said inwardly extending portions of the sidewalls of said rear frame member abut.

3. The hacksaw in accordance with claim 2 wherein said opposed edges are secured together.

4. The hacksaw in accordance with claim 1 wherein the relieved side walls of said rear frame section extend rearwardly and upwardly from the front end to said top wall.

5. The hacksaw in accordance with claim 1 wherein said rear leg member is of generally bar-like cross section with its upper end portion extending upwardly and rearwardly into said hand grip.

6. The hacksaw in accordance with claim 5 wherein said upwardly and rearwardly extending upper end portion extends within said channel of said rear frame member.

7. The hacksaw in accordance with claim 1 wherein said recesses are of inverted U-shaped configuration and have a length approximating that of said ramp to seat said ramp snugly within said recesses.

8. In a hacksaw having an adjustable frame, the combination comprising:

(a) a hand grip;

(b) an elongated rear frame member having an inverted U-shaped cross section defined by a top wall and depending side walls and providing a downwardly opening channel, said rear frame member having its rearward end portion secured in the upper portion of said hand grip, said side walls adjacent the forward end thereof having their lower portions extending inwardly and inclined upwardly towards said forward end to provide an upwardly inclined ramp substantially closing the channel and terminating in a lip at the forward end of said frame member, said inwardly extending portions of the side walls of said rear frame member abutting, the top wall and side walls adjacent thereto being relieved above said ramp;

(c) a front frame member of generally vertically oriented bar-like configuration having an elongated bridge portion with its rearward end portion seated in said channel of said rear frame section, said front frame section having a depending leg portion at the forward end of said bridge portion and blade mounting means adjacent the lower end of said leg portion, said bridge portion having a multiplicity of spaced recesses in its bottom edge, said recesses being of inverted U-shaped configuration and having a length approximating that of said ramp to seat said ramp snugly within said recesses, said lip being seated in one of said recesses; and (d) a rear leg member extending below said rear frame section forwardly of said hand grip, said rear leg member having its upper end portion seated in the upper end of said hand grip, said leg member having blade mounting means adjacent its lower end cooperating with that of said front frame member to secure a blade extending therebetween, the length of said frame being adjustable by pivoting upwardly the front end of said front frame member to disengage said lip from the recesses of said bridge portion and sliding said bridge portion within said channel of said rear frame member to align a desired recess therein with said lip and pivoting the bridge portion downwardly to effect engagement therewith.

9. The hacksaw in accordance with claim 8 wherein said opposed edges are secured together.

10. The hacksaw in accordance with claim 8 wherein the relieved side walls of said rear frame section extend rearwardly an upwardly from the front end to said top wall.

11. The hacksaw in accordance with claim 8 wherein said rear leg member is of generally bar-like cross section with its upper end portion extending upwardly and rearwardly into said hand grip.

12. The hacksaw in accordance with claim 11 wherein said upwardly and rearwardly extending upper end portion extends within said channel of said rear frame member.

* * * * *